(12) United States Patent
Moriyama et al.

(10) Patent No.: US 9,528,600 B2
(45) Date of Patent: Dec. 27, 2016

(54) HYDRAULIC CONTROL DEVICE AND VEHICLE CONTROL DEVICE

(75) Inventors: Shuji Moriyama, Susono (JP); Takuro Morino, Numadu (JP); Yoshio Ito, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/366,751

(22) PCT Filed: Dec. 26, 2011

(86) PCT No.: PCT/JP2011/080090
§ 371 (c)(1),
(2), (4) Date: Jun. 19, 2014

(87) PCT Pub. No.: WO2013/098922
PCT Pub. Date: Jul. 4, 2013

(65) Prior Publication Data
US 2014/0371012 A1    Dec. 18, 2014

(51) Int. Cl.
*F16H 61/00* (2006.01)
*F16H 61/662* (2006.01)
*F15B 1/033* (2006.01)

(52) U.S. Cl.
CPC ......... *F16H 61/0025* (2013.01); *F15B 1/033* (2013.01); *F16H 61/00* (2013.01); *F16H 61/0021* (2013.01); *F16H 61/0031* (2013.01); *F16H 61/662* (2013.01); *F16H 61/66272* (2013.01); *B60Y 2400/72* (2013.01); *F16H 2061/0034* (2013.01)

(58) Field of Classification Search
CPC ............................................... F16H 2061/0034
See application file for complete search history.

(56) References Cited

U.S. PATENT DOCUMENTS

| | | | | |
|---|---|---|---|---|
| 2002/0069847 A1* | 6/2002 | Iwano | ..................... | F15B 1/024 |
| | | | | 123/196 R |
| 2004/0266585 A1* | 12/2004 | Ochi | ....................... | B60T 1/005 |
| | | | | 477/174 |
| 2010/0167874 A1 | 7/2010 | Shirasaka et al. | | |
| 2010/0210413 A1* | 8/2010 | Yokokawa | .............. | B60W 10/11 |
| | | | | 477/40 |

FOREIGN PATENT DOCUMENTS

| | | |
|---|---|---|
| JP | 2002-115755 A | 4/2002 |
| JP | 2002-130449 A | 5/2002 |
| JP | 2006-052766 A | 2/2006 |
| JP | 2010-151226 A | 7/2010 |
| JP | 2010-151238 A | 7/2010 |
| JP | 2011-132993 A | 7/2011 |

\* cited by examiner

*Primary Examiner* — Tisha Lewis
(74) *Attorney, Agent, or Firm* — Andrews Kurth Kenyon LLP

(57) ABSTRACT

A hydraulic control device includes an electric pump configured to supply oil to a belt-type continuously variable transmission mechanism of a power transmission device through a hydraulic path based on driving of a motor, and an accumulator configured to accumulate oil inside by using the oil supplied by the electric pump and supplies the oil to a control system by discharging the accumulated oil through the hydraulic path. According to such a configuration, an increase in the sizes of the electric pump and the accumulator used for hydraulic control at the time of executing an idling stop function can be suppressed.

13 Claims, 6 Drawing Sheets

HYDRAULIC CONTROL DEVICE AND VEHICLE CONTROL DEVICE

CROSS-REFERENCE TO RELATED APPLICATIONS

This is a national phase application based on the PCT International Patent Application No. PCT/JP2011/080090 filed Dec. 26, 2011, the entire contents of which are incorporated herein by reference.

FIELD

The present invention relates to a hydraulic control device and a vehicle control device.

BACKGROUND

Conventionally, a configuration has been known in which each constituent element of a power transmission device used for delivering power from a power source (engine) of a vehicle to driving wheels is controlled using a hydraulic pressure supplied from a mechanical pump operated by engine power.

Meanwhile, in recent years, the number of vehicles provided with a technology for stopping the engine during vehicle driving, that is, a so-called idling stop function for reducing the fuel economy or the like has increased. In such vehicles, during execution of the idling stop function, the mechanical pump is stopped in accordance with the stop of the engine, and accordingly, a hydraulic pressure supplying source other than the mechanical pump used for controlling the power transmission device is necessary.

Accordingly, conventionally, in vehicles provided with the idling stop function, a configuration has been proposed in which an electric pump according to motor driving or an accumulator accumulating a hydraulic pressure at the time of normal driving is included as a hydraulic pressure supplying source at the time of stopping the engine. For example, in Patent Literature 1, a configuration is disclosed, in which hydraulic oil accumulated in the accumulator in a pressing manner is supplied to a forward clutch when the engine is restarted from an idling stop state during stop of the vehicle. In addition, in Patent Literatures 2 and 3, a configuration is disclosed in which, when an engine is restarted, a hydraulic pressure is supplied to a clutch of a power transmission device by discharging oil that is pressingly accumulated in an accumulator, and a hydraulic pressure is supplied to the power transmission device by operating an electric pump.

CITATION LIST

Patent Literature

Patent Literature 1: Japanese Patent Application Laid-open No. 2010-151226
Patent Literature 2: Japanese Patent Application Laid-open No. 2002-115755
Patent Literature 3: Japanese Patent Application Laid-open No. 2002-130449

SUMMARY

Technical Problem

Conventional hydraulic control devices as disclosed in Patent Literatures 1 to 3 are mainly for devices in which the idling stop function is executed when a vehicle stops. Here, if the above-described idling stop function to be executed when the vehicle travels at reduced speed, a situation is considered in which, for controlling the power transmission device, a hydraulic pressure that is higher than that of a case where the idling stop function is executed when the vehicle stops is necessary. More specifically, for example, in a vehicle having a configuration that includes a belt-type continuously variable transmission mechanism as one element of the power transmission device, there is a situation in which an external disturbance such as sudden braking, rough road traveling, or a change in the road surface is input from the driving wheel side to the power transmission device during the execution of the idling stop function when the vehicle performs inertia traveling.

In such a situation, there is a concern that a change in torque occurs due to the external disturbance from the driving wheel side, and a slip of a belt of the belt-type continuously variable transmission mechanism occurs. In order to prevent the occurrence of such a belt slip, a required belt clamping pressure becomes large, and accordingly, it is necessary for a hydraulic pressure controlling this belt clamping pressure to be in a high level. In order to respond to the request for a large belt clamping pressure, it is necessary to increase the size of the electric pump or the accumulator.

The present invention is contrived in consideration of the description presented above, and an object thereof is to provide a hydraulic control device and a vehicle control device capable of suppressing an increase in the size of an electric pump or an accumulator used for hydraulic control when the idling stop function is executed.

Solution to Problem

In order to achieve the above mentioned object, a hydraulic control device according to the present invention that controls a hydraulic pressure of oil supplied for operating a power transmission device including a belt-type continuously variable transmission mechanism and a clutch, the hydraulic control device includes an electric pump configured to supply oil to the belt-type continuously variable transmission mechanism of the power transmission device through a hydraulic path based on motor driving; and an accumulator configured to accumulate oil inside by using the oil supplied by the electric pump, and supply the oil to the clutch by discharging the accumulated oil through the hydraulic path.

Further, in the hydraulic control device, it is preferable that the accumulator performs pressure accumulation and discharge of oil by using the oil supplied by the electric pump as an operating pressure.

Further, in the hydraulic control device, it is preferable to further include a hydraulic passage configured to communicates with a back pressure chamber adjusting a back pressure of the accumulator such that the oil supplied by the electric pump can be introduced into the back pressure chamber; and a pressure accumulation control valve disposed on the hydraulic passage and configured to control introduction of oil into the back pressure chamber or discharge of the oil from the back pressure chamber, wherein the accumulator accumulates oil inside in a state in which the oil supplied by the electric pump is introduced into the back pressure chamber from the hydraulic passage by the pressure accumulation control valve, and supplies the oil accumulated inside to the clutch by discharging the oil to the hydraulic path in a state in which the oil is discharged from the back pressure chamber to the hydraulic passage by the pressure accumulation control valve.

Further, in the hydraulic control device, it is preferable to further include a pressure accumulation check valve disposed between the accumulator and the hydraulic path and configured to prevent a flow of oil from the hydraulic path side to the accumulator.

Further, in the hydraulic control device, it is preferable that the accumulator performs pressure accumulation of the oil supplied by the electric pump.

Further, in the hydraulic control device, it is preferable to further include a pressure accumulation hydraulic passage configured to communicate with the accumulator such that the oil supplied by the electric pump can be introduced into the accumulator; a discharge hydraulic passage configured to connect the accumulator and the hydraulic path together; and a switching valve disposed on the discharge hydraulic passage and configured to switch between communicating and blocking between the accumulator and the hydraulic path, wherein the accumulator accumulates the oil supplied from the pressure accumulation passage by the electric pump on the inside thereof in a case where the electric pump is driven and is blocked from the hydraulic passage by the switching valve, and supplies the oil accumulated inside to the clutch by discharging the accumulated oil on the inside to the hydraulic path through the discharge hydraulic passage in a case where the accumulator communicates with the hydraulic path through the switching valve.

In order to achieve the above mentioned object, a vehicle control device according to the present invention includes a power transmission device configured to include a belt-type continuously variable transmission mechanism and a clutch; and the hydraulic control device according to any one of claims 1 to 6 configured to control a hydraulic pressure of oil supplied for operating the power transmission device.

Advantageous Effects of Invention

In a hydraulic control device and a vehicle control device according to the present invention, since an electric pump directly supplies oil to a belt-type continuously variable transmission mechanism, a leaking hydraulic flow from the electric pump to the belt-type continuously variable transmission mechanism can be reduced, whereby the size of the electric pump can be configured to be small. In addition, since a time period during which oil is supplied from an accumulator can be configured to be restricted to a short time period by the time the engine is restated returning from the idling stop function, whereby the size of the accumulator can be configured to be small. As above, according to the hydraulic control device and the vehicle control device of the present invention, there is an effect of suppressing an increase in the sizes of the electric pump and the accumulator used for hydraulic control when the idling stop function is executed.

DESCRIPTION OF EMBODIMENTS

Figure 1:
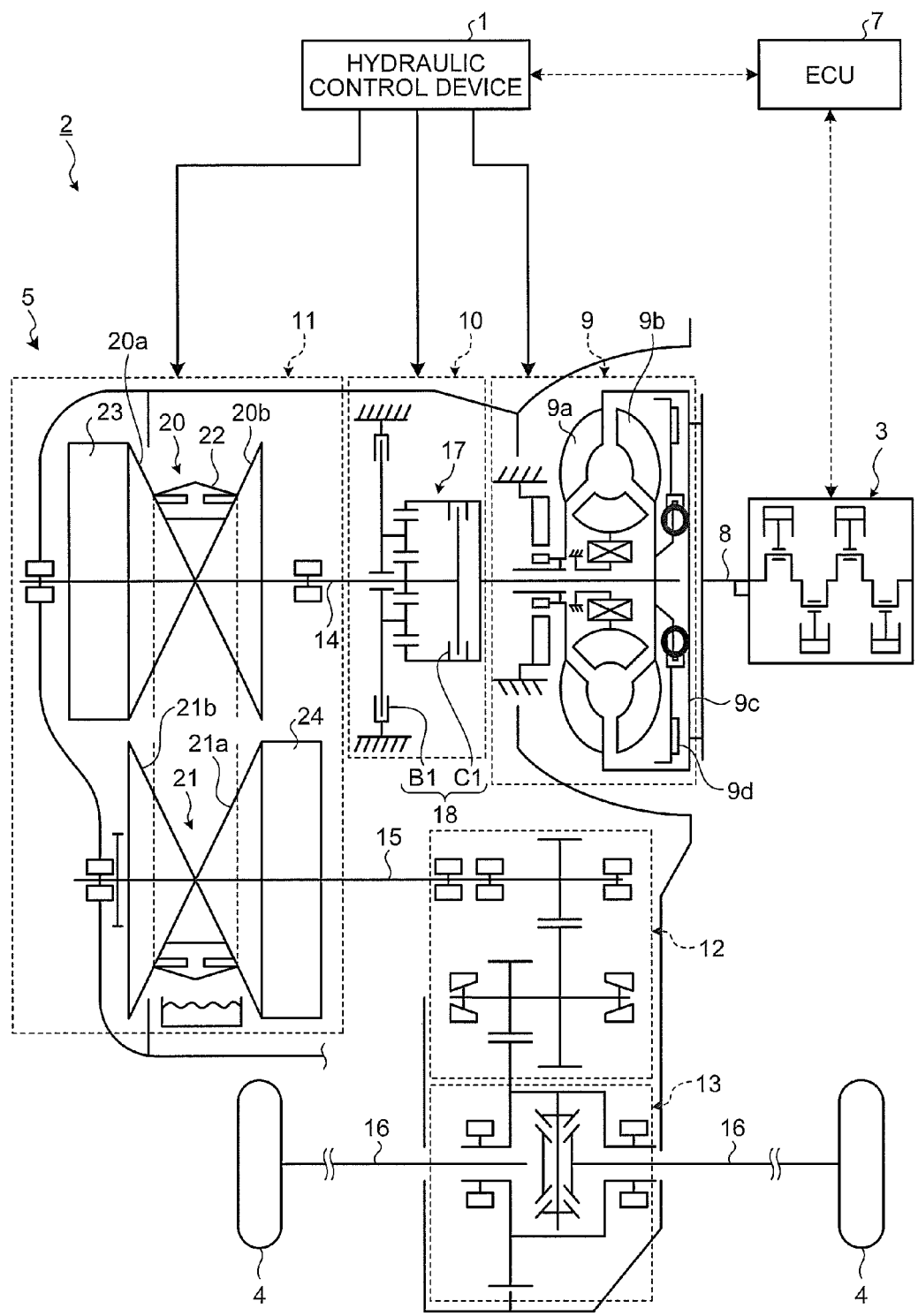
FIG. 1 is a schematic diagram illustrating the configuration of a vehicle in which a hydraulic control device according to a first embodiment of the present invention is mounted.

Hereinafter, hydraulic control devices and vehicle control devices according to embodiments of the present invention will be described with reference to the drawings. In the drawings presented below, the same reference sign will be assigned to the same portion or portions corresponding to each other, and description thereof will not be repeated.

First Embodiment

Figure 2:
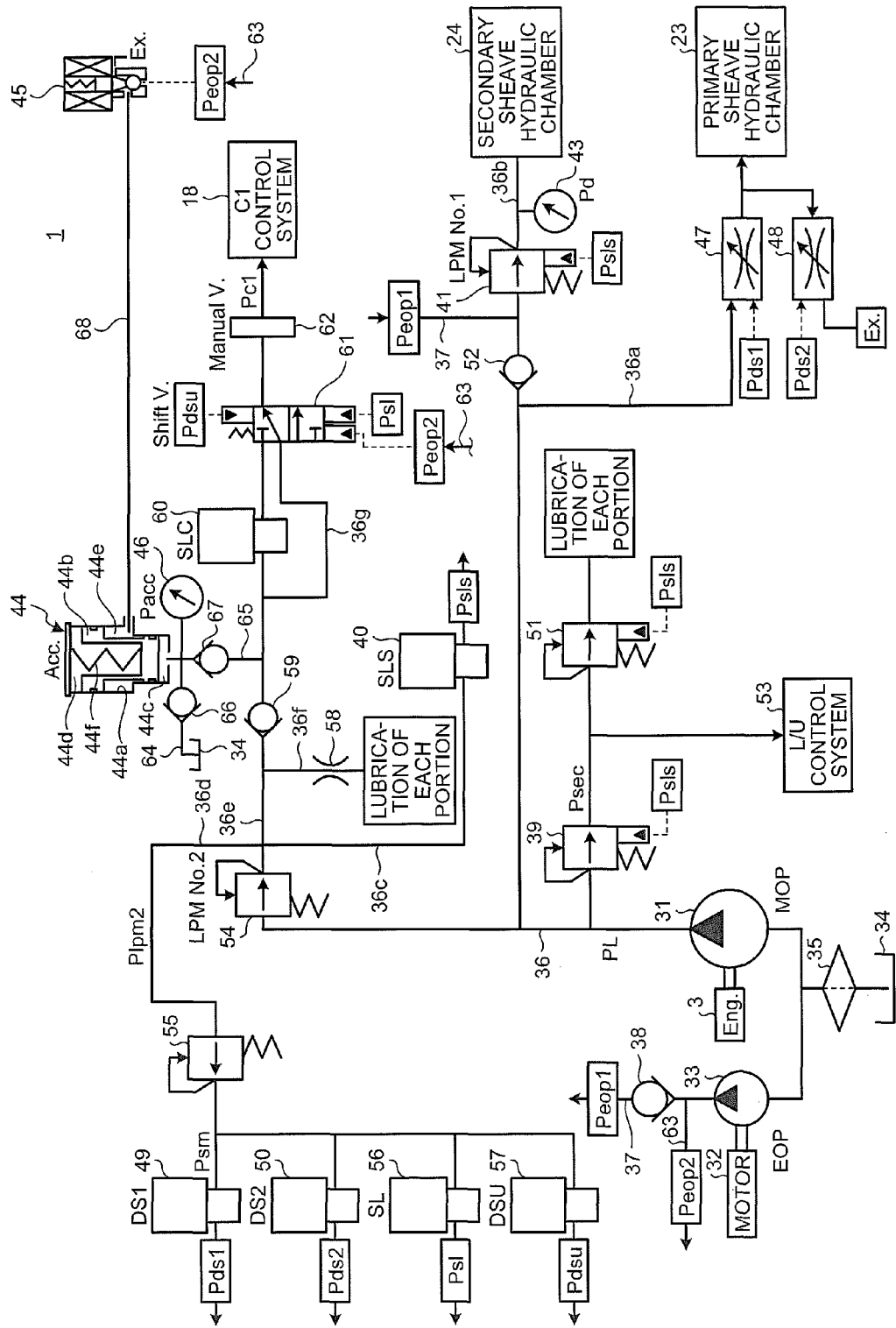
FIG. 2 is a diagram illustrating a schematic configuration of the hydraulic control device illustrated in FIG. 1.
Figure 3:
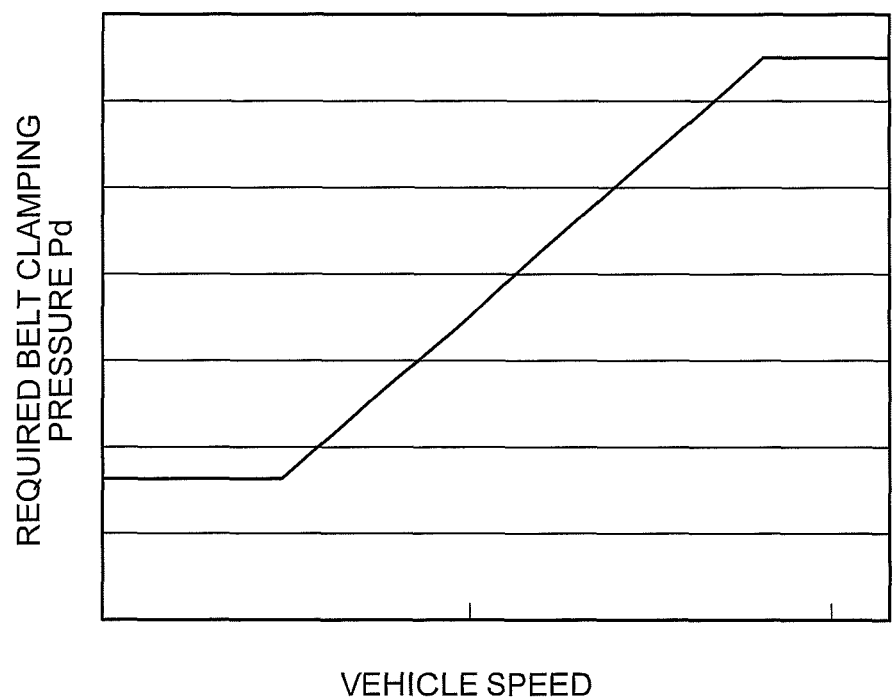
FIG. 3 is a diagram illustrating an example of a required belt clamping pressure (secondary pressure) Pd according to a vehicle speed.
Figure 4:
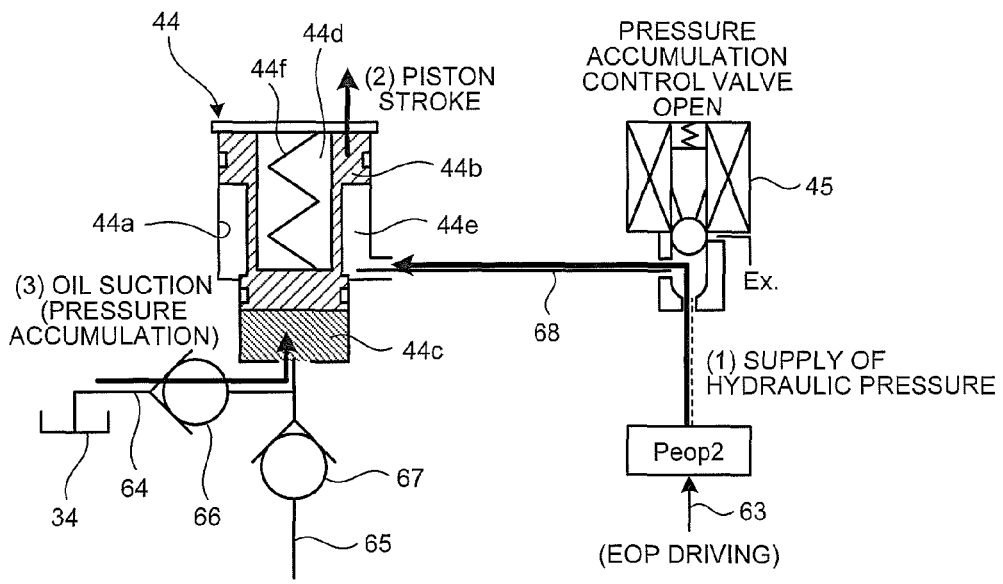
FIG. 4 is a schematic diagram illustrating the structure of pressure accumulation of an accumulator.
Figure 5:
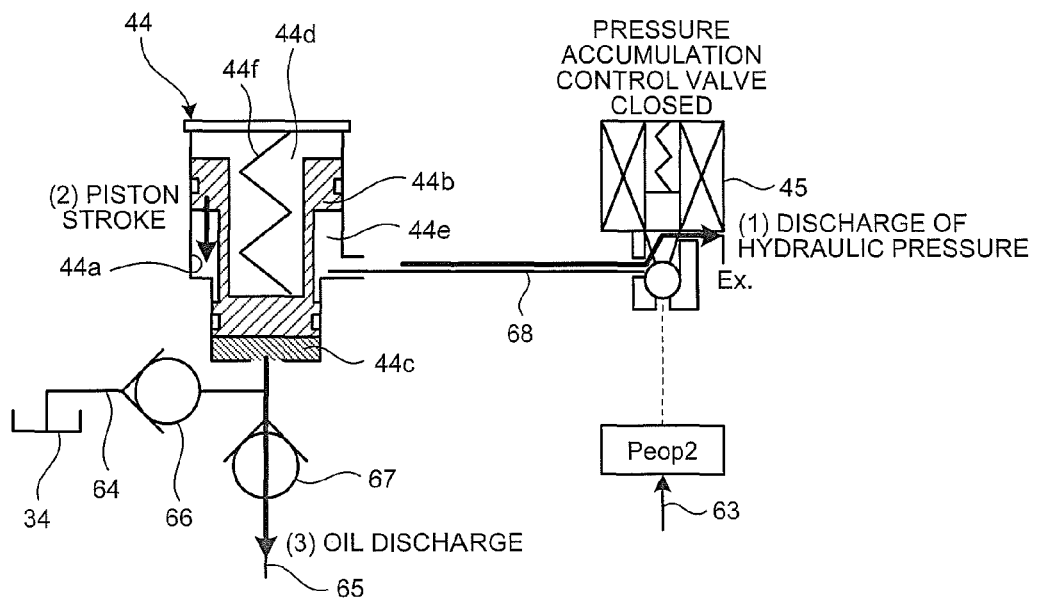
FIG. 5 is a schematic diagram illustrating the structure of the accumulator for discharge.
Figure 6:
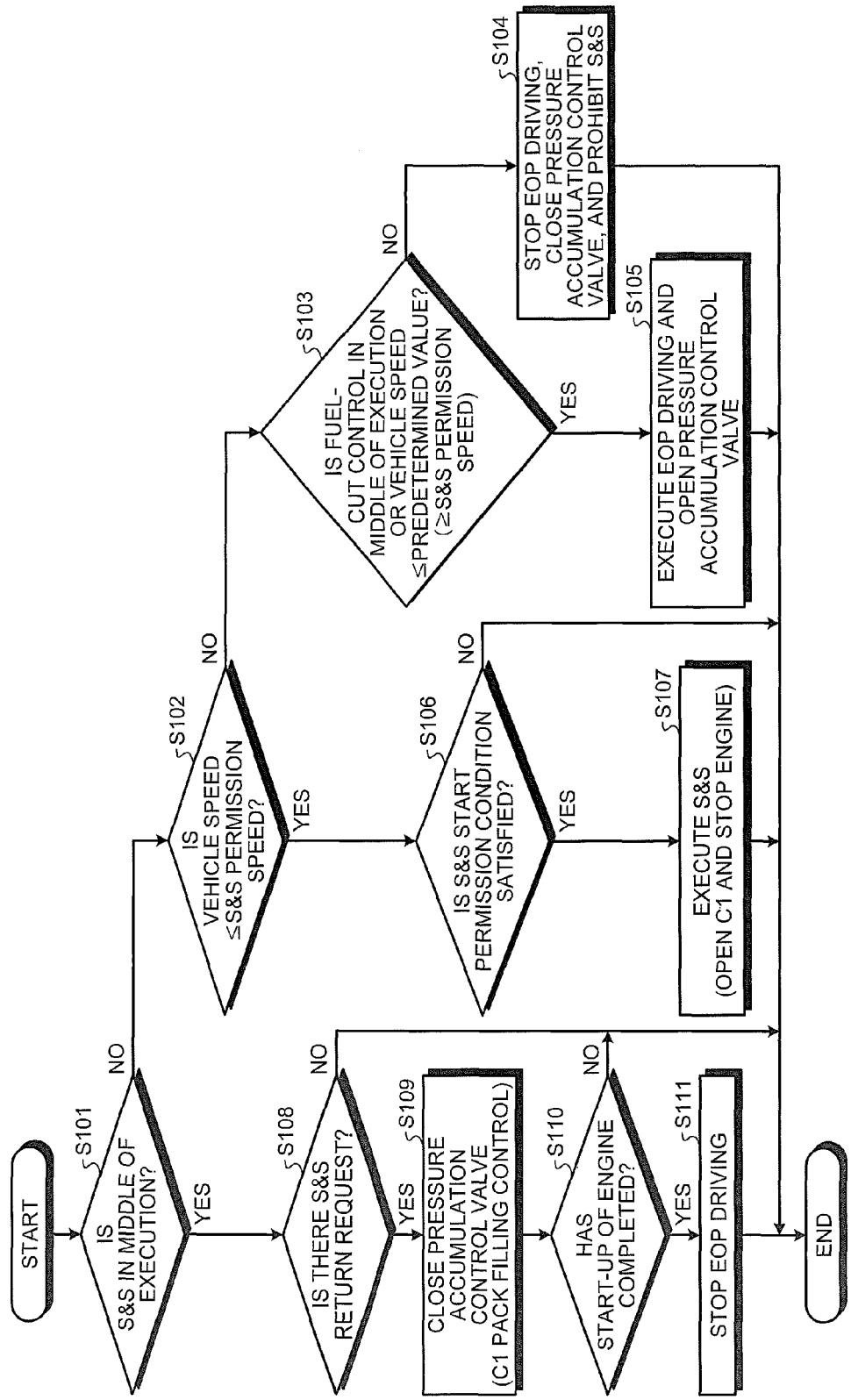
FIG. 6 is a flowchart illustrating a pressure accumulating process and a discharge process of the accumulator that are performed by the hydraulic control device according to this embodiment.

A first embodiment of the present invention will be described with reference to FIGS. 1 to 6. FIG. 1 is a schematic diagram illustrating the configuration of a vehicle 2 in which a hydraulic control device 1 according to the first embodiment of the present invention is mounted, FIG. 2 is a diagram illustrating a schematic configuration of the hydraulic control device 1 illustrated in FIG. 1, and FIG. 3 is a diagram illustrating an example of a required belt clamping pressure (secondary pressure) Pd according to a vehicle speed. In addition, FIG. 4 is a schematic diagram illustrating the structure of pressure accumulation of an accumulator, FIG. 5 is a schematic diagram illustrating the structure of the accumulator for discharge, and FIG. 6 is a flowchart illustrating a pressure accumulating process and a discharge process of an accumulator 44 that are performed by the hydraulic control device 1 according to this embodiment.

First, with reference to FIG. 1, the configuration of the vehicle 2 in which the hydraulic control device 1 according to this embodiment is mounted will be described. As illustrated in FIG. 1, this vehicle 2 includes: an engine 3 that is a power source at the time of traveling; driving wheels 4; a power transmission device 5; the hydraulic control device 1; and an ECU (Electronic Control Unit) 7.

The engine 3 is a driving source (prime mover) for traveling that allows the vehicle 2 to travel and generates power that operates on the driving wheels 4 of the vehicle 2 by consuming fuel. The engine 3 generates mechanical power (engine torque) to a crank shaft 8 that is an engine output shaft in accordance with the combustion of the fuel and can output the mechanical power from the crank shaft 8 to the driving wheels 4.

The power transmission device 5 delivers power from the engine 3 to the driving wheels 4. The power transmission device 5 is disposed in a power transmission path from the engine 3 to the driving wheels 4 and is operated in accordance with the pressure of oil (hydraulic pressure) as a liquid medium.

Described in more detail, the power transmission device 5 is configured to include a torque converter 9, a forward/backward traveling switching mechanism 10, a continuously variable transmission mechanism 11, a speed reduction mechanism 12, a differential gear 13, and the like. In the power transmission device 5, an input shaft 14 of the continuously variable transmission mechanism 11 is connected to the crank shaft 8 of the engine 3 through the torque converter 9, the forward/backward traveling switching mechanism 10, and the like, and an output shaft 15 of the continuously variable transmission mechanism 11 is connected to the driving wheels 4 through the speed reduction mechanism 12, the differential gear 13, the driving shaft 16, and the like.

The torque converter 9 is arranged between the engine 3 and the forward/backward traveling switching mechanism 10 and can amplify (or maintain) the torque of power delivered from the engine 3 and deliver the torque to the forward/backward traveling switching mechanism 10. The torque converter 9 includes a pump impeller 9a and a turbine runner 9b arranged to face each other in a rotatable manner and is configured to combine the pump impeller 9a to be integrally rotatable with the crank shaft 8 through a front cover 9c and connect the turbine runner 9b to the forward/backward traveling switching mechanism 10. In accordance with the rotation of the pump impeller 9a and the turbine runner 9b, a viscous fluid such as hydraulic oil interposed between the pump impeller 9a and the turbine runner 9b circulates, whereby the torque can be amplified and delivered while a differential motion between the input and the output thereof is allowed.

In addition, the torque converter 9 further includes a lock-up clutch 9d that is disposed between the turbine runner 9b and the front cover 9c and is connected to the turbine runner 9b to be integrally rotatable therewith. This lock-up clutch 9d is operated in accordance with the pressure of oil supplied from a hydraulic control device 1 to be described later and is switchable between an engaged state (lock-up On) and a released state (lock-up Off) for the front cover 9c. In the state in which the lock-up clutch 9d is engaged with the front cover 9c, the front cover 9c (in other words, the pump impeller 9a) and the turbine runner 9b are engaged with each other, relative rotation between the pump impeller 9a and the turbine runner 9b is regulated, and a differential motion between the input and the output is prohibited, whereby the torque converter 9 directly delivers the torque delivered from the engine 3 to the forward/backward traveling switching mechanism 10.

The forward/backward traveling switching mechanism 10 can shift the speed of power (rotation output) supplied from the engine 3 and can switch the rotation direction thereof. The forward/backward traveling switching mechanism 10 is configured to include a planetary gear mechanism 17 and a forward/backward switching clutch (forward clutch) C1 and a forward/backward switching brake (reverse brake) B1 as frictional engagement elements, and the like. The planetary gear mechanism 17 is a differential mechanism that is configured to include a sun gear, a ring gear, a carrier, and the like as a plurality of rotary elements that can differentially rotate with one another. The forward/backward switching clutch C1 and the forward/backward switching brake B1 are engagement elements that are used for changing the operating state of the planetary gear mechanism 17 and may be configured by friction-type engagement mechanisms such as multiple disk clutches, and here, hydraulic wet-type multiple disk clutches are used.

In the forward/backward traveling switching mechanism 10, the forward/backward switching clutch C1 and the forward/backward switching brake B1 operate in accordance with the pressure of oil supplied from the hydraulic control device 1 to be described later, whereby the operating state is changed. In a case where the forward/backward switching clutch C1 is in the engaged state (On state), and the forward/backward switching brake B1 is in the released state (Off state), the forward/backward traveling switching mechanism 10 delivers power supplied from the engine 3 to the input shaft 14 in positive rotation (in a direction in which the input shaft 14 rotates when the vehicle 2 travels forward). On the other hand, in a case where the forward/backward switching clutch C1 is in the released state, and the forward/backward switching brake B1 is in the engaged state, the forward/backward traveling switching mechanism 10 delivers power supplied from the engine 3 to the input shaft 14 in reverse rotation (in a direction in which the input shaft 14 rotates when the vehicle 2 travels backward). When being in a neutral state, in the forward/backward traveling switching mechanism 10, both the forward/backward switching clutch C1 and the forward/backward switching brake B1 are set to be in the released state. In this embodiment, a control system controlling the engagement/release of the forward/backward switching clutch C1 and the forward/backward switching brake B1 is collectively referred to as a "C1 control system" 18.

The continuously variable transmission mechanism 11 is disposed between the forward/backward traveling switching mechanism 10 and the driving wheels 4 in the delivery path of power from the engine 3 to the driving wheels 4 and is a speed change gear that can change the transmission of the power delivered from the engine 3 and output the power. The continuously variable transmission mechanism 11 operates in accordance with the pressure of oil supplied from the hydraulic control device 1 to be described later.

The continuously variable transmission mechanism 11 changes the speed of the rotation power (rotation output) transmitted from the engine 3 that is delivered (input) to the input shaft 14 at a predetermined transmission gear ratio, delivers the rotation power to the output shaft 15 that is the output shaft of the transmission gear, and outputs the power of which the speed has been changed from the output shaft 15 to the driving wheels 4. Described in more detail, the continuously variable transmission mechanism 11 is a belt-type continuously variable transmission (CVT) that is configured to include a primary pulley 20 connected to the input shaft (primary shaft) 14, a secondary pulley 21 connected to the output shaft (secondary shaft) 15, a belt 22 that is stretched over between the primary pulley 20 and the secondary pulley 21, and the like.

The primary pulley 20 is formed by arranging a movable sheave 20a (primary sheave) that is movable in the axial direction of the primary shaft 14 and a fixed sheave 20b on the same shaft so as to face each other, and, similarly, the secondary pulley 21 is formed by arranging a movable sheave 21a (secondary sheave) that is movable in the axial direction of the secondary shaft 15 and a fixed sheave 21b on the same shaft so as to face each other. The belt 22 is stretched over a "V"-shaped groove formed between the movable sheaves 20a and 21a and the fixed sheaves 20b and 21b.

In accordance with pressures (a primary pressure and a secondary pressure) of oil supplied to a primary sheave hydraulic chamber 23 of the primary pulley 20 and a secondary sheave hydraulic chamber 24 of the secondary pulley 21 from the hydraulic control device 1 to be described later, the continuously variable transmission mechanism 11 can individually control interposing forces (belt clamping pressures) applied between the movable sheaves 20a and 21a and the fixed sheaves 20b and 21b for interposing the belt 22 therebetween for the primary pulley 20 and the secondary pulley 21. Accordingly, for each one of the primary pulley 20 and the secondary pulley 21, the radius of rotation of the belt 22 can be adjusted by changing the "V" width, and the change gear ratio that is a ratio between an input rotation number (primary rotation number) corresponding to the input rotation speed of the primary pulley 20 and an output rotation number (secondary rotation number) corresponding to the output rotation speed of the secondary pulley 21 can be changed in a continuous manner. In addition, by adjusting the belt clamping pressures of the primary pulley 20 and the secondary pulley 21, power can be delivered with a torque capacity corresponding thereto.

The speed reduction mechanism 12 reduces the rotation speed of the power delivered from the continuously variable transmission mechanism 11 and delivers the power to the differential gear 13. The differential gear 13 delivers the power delivered from the speed reduction mechanism 12 to each driving wheel 4 through each driving shaft 16. The differential gear 13 absorbs a difference in the rotation speeds of the center of a turn, in other words, the driving wheel 4 disposed on the inner side and the driving wheel 4 disposed on the outer side that is generated when the vehicle 2 turns.

The power transmission device 5 configured as described above can deliver power generated by the engine 3 to the driving wheels 4 through the torque converter 9, the forward/backward traveling switching mechanism 10, the continuously variable transmission mechanism 11, the speed reduction mechanism 12, the differential gear 13, and the like. As a result, a driving force [N] is generated on the contact surface of the driving wheels 4 with the road surface, whereby the vehicle 2 can travel.

The hydraulic control device 1 operates the power transmission device 5 including the lock-up clutch 9d of the torque converter 9, the forward/backward switching clutch C1 and the forward/backward switching brake B1 of the forward/backward traveling switching mechanism 10, the primary sheave 20a and the secondary sheave 21a of the continuously variable transmission mechanism 11, and the like by the hydraulic pressure as fluid. The hydraulic control device 1, for example, is configured to include various hydraulic control circuits controlled by the ECU 7. The hydraulic control device 1 is configured to include a plurality of oil passages, an oil reservoir, an oil pump, a plurality of solenoid valves, and the like and controls the amount or the hydraulic pressure of oil supplied to each unit of the power transmission device 5 in accordance with a signal transmitted from the ECU 7 to be described later. In addition, this hydraulic control device 1 also serves as a lubricating oil supplying device that lubricates predetermined portions of the power transmission device 5.

The ECU 7 controls the driving of each unit of the vehicle 2. Physically, the ECU 7 is an electronic circuit having a known microcomputer that includes a CPU (Central Processing Unit), a RAM (Random Access Memory), a ROM (Read Only Memory), and an interface as its main body. The function of the ECU 7 is realized by operating various devices disposed inside the vehicle 2 under the control of the CPU and reading and writing data from/into the RAM and the ROM by loading an application program stored in the ROM into the RAM and executing the application program in CPU. In this embodiment, the ECU 7 controls the units of the power transmission device 5 such as the torque converter 9, the forward/backward traveling switching mechanism 10, and the continuously variable transmission mechanism 11 by controlling the above-described hydraulic control device 1. The ECU 7 is not limited to the above-described function but includes other various functions used for various control processes of the vehicle 2.

In addition, the above-described ECU 7 may have a configuration that includes a plurality of ECUs such as an engine ECU controlling the engine 3, a T/M ECU controlling the power transmission device 5 (the hydraulic control device 1), an S&S ECU used for performing the idling stop (S&S (start & stop)) control.

Next, the configuration of the hydraulic control device 1 according to this embodiment will be described with reference to FIG. 2.

As illustrated in FIG. 2, the hydraulic control device 1 includes a mechanical pump 31 driven in accordance with the driving of the engine 3 (hereinafter, also referred to as "Eng.") as an oil supplying source that supplies oil to each unit of the power transmission device 5. After filtering oil stored in a drain 34 inside the hydraulic control device 1 using a strainer 35, the mechanical pump 31 sucks and compresses the oil and discharges the oil. The mechanical pump 31 can supply the discharged oil to the power transmission device 5 through a hydraulic path 36.

In the hydraulic path 36, a primary regulator valve 39 is disposed. The primary regulator valve 39 regulates the hydraulic pressure that is generated by the mechanical pump 31. A control pressure Psls is supplied to the primary regulator valve 39 by an SLS linear solenoid 40, and the primary regulator valve 39 regulates the hydraulic pressure of the inside of the hydraulic path 36 in accordance with the control pressure Psls. Then, the hydraulic pressure of the inside of the hydraulic path 36 that is regulated by the primary regulator valve 39 is used as a line pressure PL.

As the primary regulator valve 39, for example, a spool valve that performs opening/closing of a hydraulic passage or switching thereof by sliding a valve body (spool) in its axial direction inside the valve body may be used and may be configured such that the hydraulic path 36 is connected to an input port, the SLS linear solenoid 40 is connected to a pilot port to which a pilot pressure is input, and a control pressure Psls is input to the pilot port, and an excess flow generated by regulating the line pressure PL is discharged from an output port.

The mechanical pump 31 is connected to the C1 control system 18 (the forward/backward switching clutch C1 and the forward/backward switching brake B1) of the forward/backward traveling switching mechanism 10 through the hydraulic path 36 so as to supply a hydraulic pressure regulated to be the line pressure PL by the primary regulator valve 39 to the continuously variable transmission mechanism 11 (the primary sheave hydraulic chamber 23 of the primary sheave 20a and the secondary sheave hydraulic chamber 24 of the secondary sheave 21a).

The hydraulic path 36 connected to the continuously variable transmission mechanism 11 (the primary sheave 20a and the secondary sheave 21a) branches into a first hydraulic passage 36a that supplies a hydraulic pressure to the primary sheave hydraulic chamber 23 of the primary sheave 20a and a second hydraulic passage 36b that supplies a hydraulic pressure to the secondary sheave hydraulic chamber 24 of the secondary sheave 21a.

Out of these, on the second hydraulic passage 36b, an LPM (Line Pressure Modulator) No. 1 valve (a belt clamping pressure control valve) 41 is disposed. The LPM No. 1 valve 41 outputs a hydraulic pressure that is regulated with the line pressure PL set as a pressure at the source. The control pressure Psls is supplied to the LPM No. 1 valve 41 by the SLS linear solenoid 40.

The LPM No. 1 valve 41, for example, is a spool valve and outputs a hydraulic pressure that is regulated (pressure reduction) with the output hydraulic pressure Psls of the SLS linear solenoid 40 of which the duty is controlled by the ECU 7 being set as the pilot pressure and the line pressure PL introduced into the inside of the valve being set as the pressure at the source. The hydraulic pressure that is regulated and output from the LPM No. 1 valve 41 is used as the secondary pressure Pd (the belt clamping pressure) and is supplied to the secondary sheave hydraulic chamber 24. In other words, the LPM No. 1 valve 41 controls the secondary pressure Pd in accordance with the control pressure Psls. The thrust of the secondary sheave 21a changes in accordance with the secondary pressure Pd supplied to the secondary sheave hydraulic chamber 24, and the belt clamping pressure of the continuously variable transmission mechanism 11 is increased or decreased.

In addition, between the LPM No. 1 valve 41 disposed on the second hydraulic passage 36b (referenced in the claims as the first hydraulic path) and the secondary sheave hydraulic chamber 24, a pressure sensor 43 that detects the secondary pressure Pd is disposed, and information of the detected secondary pressure Pd is configured to be transmitted to the ECU 7.

On the first hydraulic passage 36a, a first transmission control valve 47 and a second transmission control valve 48 are disposed. The first transmission control valve 47 adjusts the supply of oil to the primary sheave hydraulic chamber 23 in accordance with a control pressure Pds1 supplied from a first duty solenoid (DS1) 49 of which the duty is controlled by the ECU 7. In addition, the second transmission control valve 48 adjusts the discharge of oil from the primary sheave hydraulic chamber 23 in accordance with a control pressure Pds2 supplied from a second duty solenoid (DS2) 50 of which the duty is controlled by the ECU 7.

In other words, when the first duty solenoid 49 operates, oil is introduced into the primary sheave hydraulic chamber 23 from the first transmission control valve 47, the primary sheave 20a moves in a direction decreasing the width of the groove of the primary pulley 20, and, as a result, the contact diameter of the belt 22 increases for an up-shift. On the other hand, when the second duty solenoid 50 operates, oil is discharged from the primary sheave hydraulic chamber 23 by the second transmission control valve 48, the primary sheave 20a moves in a direction increasing the width of the groove of the primary pulley 20, and, as a result, the contact diameter of the belt 22 decreases for a down-shift. As above, by adjusting the control pressures Pds1 and Pds2 by operating the first duty solenoid 49 and the second duty solenoid 50, the amount of oil inside the primary sheave hydraulic chamber 23 changes, whereby the gear change ratio of the continuously variable transmission mechanism 11 can be controlled.

On the hydraulic path 36 connected to the C1 control system 18, an LPM No. 2 valve (a pressure regulating valve) 54 is disposed. The LPM No. 2 valve 54, similar to the LPM No. 1 valve 41, for example, is a spool valve and outputs a predetermined hydraulic pressure Plpm2 that is regulated (pressure reduction) with the line pressure PL introduced into the inside of the valve being set as the pressure at the source.

The hydraulic path 36 branches into a third hydraulic passage 36c, a fourth hydraulic passage 36d, and a fifth hydraulic passage 36e (referenced in the claims as the second hydraulic path) on the downstream side of the LPM No. 2 valve 54. The third hydraulic passage 36c is connected to the above-described SLS linear solenoid 40. The SLS linear solenoid 40 is a solenoid valve that generates a control pressure in accordance with a current value determined based on a duty signal (a duty value) transmitted from the ECU 7. In this embodiment, the control pressure Psls is output based on the input hydraulic pressure Plpm2, whereby the control pressure Psls is supplied to the LPM No. 1 valve 41, the primary regulator valve 39 and the secondary regulator valve 51.

The fourth hydraulic passage 36d is connected to a solenoid adjustment valve 55. The solenoid adjustment valve 55, similar to the LPM No. 2 valve 54, for example, is a spool value and outputs a predetermined hydraulic pressure Psm that is regulated with the input hydraulic pressure Plpm2 being used as the pressure at the source.

On the downstream side of the solenoid adjustment valve 55 of the fourth hydraulic passage 36d, additionally, a first duty solenoid (DS1) 49, a second duty solenoid (DS2) 50, an SL on/off solenoid 56, and a DSU duty solenoid 57 are connected in parallel with each other. The first duty solenoid (DS1) 49, the second duty solenoid (DS2) 50, the SL on/off solenoid 56, and the DSU duty solenoid 57, similar to the SLS linear solenoid 40, are solenoid valves that generate control pressures in accordance with a current value determined in accordance with a duty signal (the duty value) transmitted from the ECU 7 and, in this embodiment, output control pressures Pds1, Pds2, Psl, and Pdsu based on the hydraulic pressure Psm regulated by the solenoid adjustment valve 55. The control pressures Pds1 and Pds2 generated by the first duty solenoid 49 and the second duty solenoid 50 are supplied to the first transmission control valve 47 and the second transmission control valve 48 that control the amount of oil of the primary sheave hydraulic chamber 23 of the continuously variable transmission mechanism 11. The control pressure Psl and Pdsu generated by the SL on/off solenoid 56 and the DSU duty solenoid 57 are supplied to a shift valve 61 and an L/U control system 53 (a control system that controls engagement/release of the lock-up clutch 9d of the torque converter 9) on the fifth hydraulic passage 36e to be described later.

From the fifth hydraulic passage 36e, a sixth hydraulic passage 36f further branches. This sixth hydraulic passage 36f is configured to supply oil of the hydraulic pressure Plpm2 for the lubrication of each portion of a predetermined place inside the power transmission device 5 through an orifice 58. Although not illustrated in FIG. 2, the hydraulic passage is formed such that the oil supplied for the lubrication of each portion is finally returned to the drain 37.

On the fifth hydraulic passage 36e disposed on the downstream side of the sixth hydraulic passage 36f, an SLC linear solenoid 60 (a clutch pressure limiting valve) is disposed. The SLC linear solenoid 60, similar to the SLS linear solenoid 40 or the like, is a solenoid valve that generates a control pressure in accordance with a current value determined based on the duty signal (the duty value) transmitted from the ECU 7. In this embodiment, the SLC linear solenoid 60 controls a control pressure (clutch pressure) Pc1 supplied to the C1 control system 18 with the hydraulic pressure Plpm2 used as the pressure at the source.

In addition, in the fifth hydraulic passage 36e, an alternative path 36g that makes a detour around the SLC linear solenoid 60 is formed and is connected to the shift valve 61 (a switching valve) on the downstream side of the SLC linear solenoid 60 together with the fifth hydraulic passage 36e.

The shift valve 61 selects a hydraulic pressure supplied to the C1 control system 18 from between the clutch pressure Pc1 adjusted by the SLC linear solenoid 60 and the hydraulic pressure Plpm2, which is regulated by the LPM No. 2 valve 54, input from the alternative path 36g. The shift valve 61 performs switching in accordance with the control pressures Psl and Pdsu generated by the SL on/off solenoid 56 and the DSU duty solenoid 57. In this embodiment, in a case where the control pressure Psl is input from the SL on/off solenoid 56, the shift valve 61 performs switching such that the clutch pressure Pc1 adjusted by the SLC linear solenoid 60 is supplied to the C1 control system 18. On the other hand, in a case where the control pressure Pdsu is input from the DSU duty solenoid 57, switching is made such that the hydraulic pressure Plpm2 supplied from the alternative path 36g is supplied to the C1 control system 18.

On the downstream side of the shift valve 61 of the fifth hydraulic passage 36e, a manual valve 62 is additionally disposed. The manual valve 62 performs switching between hydraulic passages in accordance with a shift operation of a driver driving the vehicle 2. For example, in a case where the shift position is "D (forward)", the manual valve 62 connects the hydraulic passage to the forward/backward switching clutch C1 in the C1 control system 18 and causes the forward/backward switching clutch C1 to be controllable. On the other hand, in a case where the shift position is "R (Reverse)", the manual valve 62 connects the hydraulic passage to the forward/backward switching brake B1 in the C1 control system 18 and causes the forward/backward switching brake B1 to be controllable. In addition, in a case where the shift position is "N (Neutral)", the manual valve 62 does not connect the hydraulic passage to any one of the forward/backward switching clutch C1 and the forward/backward switching brake B1.

The secondary regulator valve 51 is connected to an output port of the primary regulator valve 39. This secondary regulator valve 51, similar to the primary regulator valve 39, is also a spool valve and regulates the hydraulic pressure of an excess flow discharged from the primary regulator valve 39 in accordance with the control pressure Psls of the SLS linear solenoid 40 of which the duty is controlled by the ECU 7.

The L/U control system 53 that controls the engagement/release of the lock-up clutch 9d of the torque converter 9 is additionally connected to the output port of the primary regulator valve 39. When an excess flow is generated from the primary regulator valve 39, the excess flow is regulated by the secondary regulator valve 51 and the regulated excess flow is configured to be supplied to the L/U control system 53 (or a low-pressure control system that can perform control at a pressure lower than that of the continuously variable transmission mechanism 11).

In addition, the secondary regulator valve 51 is configured to supply an additional excess flow generated by the regulated pressure of the excess flow from the output port for the lubrication of each portion of a predetermined place inside the power transmission device 5 or the like. Although not illustrated in FIG. 2, the hydraulic passage is formed such that the excess flow supplied to the L/U control system 53 and the excess flow supplied for the lubrication of each portion or the like are finally returned to the drain 34.

In the example illustrated in FIG. 2, while a configuration has been employed in which the single SLS linear solenoid 40 generates the control pressures Psls of the primary regulator valve 39, the secondary regulator valve 51, and the LPM No. 1 valve 41, a configuration may be employed in which an individual linear solenoid is disposed in each valve, and the control pressure thereof can be individually controlled by the ECU 7.

Here, particularly in the vehicle 2 according to this embodiment, for the improvement of fuel efficiency and the like, a function for stopping the engine 3 during stopping or traveling of the vehicle 2, a so-called idling stop function (in this embodiment, also referred to as "S&S control") is provided, and, in a case where a predetermined condition is satisfied during the traveling of the vehicle 2 as in the case of, particularly, speed-reduced traveling or the like, idling stop traveling (in this embodiment, also referred to as "speed reduction S&S control") is configured to be performed in which traveling is performed in a state in which the stop of the engine 3 and the release of the clutch are performed together. Since the engine 3 stops during the idling stop traveling, the mechanical pump 31 operating in accordance with the driving of the engine is stopped as well. Accordingly, the hydraulic control device 1 according to this embodiment includes an electric pump 33, which operates in accordance with the driving of a motor 32 operating depending on the electricity, as an alternative of the mechanical pump 31 at the time of executing the idling stop function, in other words, at the time of stopping the engine 3.

Similar to the mechanical pump 31, the electric pump 33 is an oil pump that filters oil stored in the drain 34 inside the hydraulic control device 1 using the strainer 35, then sucks and compresses the oil, and discharges the oil. The electric pump 33, as illustrated in FIG. 2, communicates with the second hydraulic passage 36b of the hydraulic path 36 through an exit hydraulic passage 37 connected to the discharge port. On this exit hydraulic passage 37, a check valve 38 that prevents a backward flow of the oil from the second hydraulic passage 36b of the hydraulic path 36 to the electric pump 33 is disposed. As above, when the mechanical pump 31 is stopped in accordance with the stopping of the engine 3 during the execution of the idling stop function, the electric pump 33 is configured to secure the secondary pressure (the belt clamping pressure) Pd that is sufficient for suppressing the slip of the belt of the continuously variable transmission mechanism 11 by supplying oil of the hydraulic pressure Peop1 to the second hydraulic passage 36b of the hydraulic path 36 in accordance with the driving of the motor 32.

On the second hydraulic passage 36b, a check valve (a pressure-up check valve) 52 is disposed on the upstream side of the LPM No. 1 valve 41 and is configured to efficiently raise the secondary pressure Pd using the electric pump 33 by preventing oil discharged from the electric pump 33 from flowing backward to the upstream side (the side of the mechanical pump 31 and the C1 control system 18) and from flowing into the first hydraulic passage 36a connected to the primary sheave 20a. The exit hydraulic passage 37 from the electric pump 33 is connected to the hydraulic path 36 between this check valve 52 and the secondary sheave hydraulic chamber 24, and more preferably, between the check valve 52 and the LPM No. 1 valve 41.

The hydraulic pressure Peop1 of the oil that can be discharged from the electric pump 33 may be of a degree for which the secondary pressure Pd during the idling stop traveling can be maintained at a level required for securing a lowest belt clamping pressure for avoiding the occurrence of a slip of the belt 22 of the continuously variable transmission mechanism 11. Even in a case where an external disturbance such as sudden braking, rough road traveling, or a change in the road surface is input from the driving wheel 4 side to the power transmission device 5 during the idling stop traveling of the vehicle 2, and there is a large change in the torque, such a belt clamping pressure can prevent a slip of the belt bearing the change in the torque. In the hydraulic control device 1 according to this embodiment, by using the electric pump having a power consumption of about 10 Watts, the hydraulic pressure Peop1 that can realize such a belt clamping pressure can be output.

In addition, the electric pump 33 is configured to control the amount of discharge by adjusting the driving force of the motor 32 based on a control instruction supplied from the ECU 7. For example, by controlling the hydraulic pressure Peop1 by changing the amount of discharge in accordance with the vehicle speed, the secondary pressure (the belt clamping pressure) Pd used for generating a required belt clamping pressure according to the vehicle speed can be secured. In addition, the relation between the vehicle speed and the required belt clamping pressure (the secondary pressure Pd), for example, as illustrated in FIG. 3, may be set such that the required belt clamping pressure is constant in an extremely low zone of the vehicle speed, the required belt clamping pressure monotonously increases in accordance with an increase in the vehicle speed thereafter, and, when the vehicle speed arrives at a predetermined value, the required belt clamping pressure has a constant value again.

Referring back to FIG. 2, on the upstream side of the check valve 38 of the exit hydraulic passage 37, a second exit hydraulic passage 63 that enables a part of the oil discharged from the electric pump 33 to communicate with the pilot port of the shift valve 61 is disposed.

When the engine 3 is driven, the shift valve 61 can shift the hydraulic passage supplying a hydraulic pressure to the C1 control system 18 to one of the fifth hydraulic passage 36e and the alternative path 36g in accordance with operating pressures Psl and Pdsu generated by the SL on/off solenoid 56 and the DSU duty solenoid 57 as described above. In a case where the fifth hydraulic passage 36e is connected to the C1 control system 18, oil of the clutch pressure Pc1 that is appropriately controlled by the SLC linear solenoid 60 is supplied to the C1 control system 18. In a case where the alternative path 36g is connected to the C1 control system 18, oil of a predetermined hydraulic pressure Plmp2 that is regulated by the LPM No. 2 valve 54 is supplied to the C1 control system 18.

According to this embodiment, when a part (represented as a hydraulic pressure Peop2 in FIG. 2) of oil is supplied from the electric pump 33 to the shift valve 61 through the second exit hydraulic passage 63, the shift valve 61 is configured to perform switching such that the fifth hydraulic passage 36e is connected to the C1 control system 18.

According to such a configuration, when the idling stop function is executed, during a period in which the electric pump 33 operates, the shift valve 61 connects the fifth hydraulic passage 36e to the C1 control system 18, and the clutch pressure Pc1 of oil supplied to the C1 control system 18 can be controlled by the SLC linear solenoid 60.

In addition, at the time of normal traveling, even in a case where the SL on/off solenoid 56 fails (breaks down), the shift valve 61 can be controlled in switching by driving the electric pump 33, and accordingly, there is an advantage of being fail-safe.

Furthermore, conventionally, the SL on/off solenoid 56 and the DSU duty solenoid 57 are used to be common to the switching control of the shift valve 61 and the control of the L/U control system 53, and accordingly, both systems cannot be independently controlled. However, according to this embodiment, since the electric pump 33 is used for the switching control of the shift valve 61, the C1 control system 18 and the L/U control system 53 can be independently controlled, and accordingly, the degree of freedom is high in the control process.

In addition, the second exit hydraulic passage 63, as illustrated in FIG. 2, is connected also to a second back pressure chamber 44e of the accumulator 44 to be described later and is configured to be able to adjust the back pressure of the accumulator 44 using the hydraulic pressure Peop2 output from the electric pump 33. Here, the hydraulic pressure Peop1 discharged from the electric pump 33 to the exit hydraulic passage 37 and the hydraulic pressure Peop2 discharged to the second exit hydraulic passage 63 are the same.

The accumulator 44 is connected to the hydraulic path 36 (preferably, the fifth hydraulic passage 36e) connected to the C1 control system 18. The accumulator 44 is configured to store and maintain (pressure accumulation) a hydraulic pressure on the inside thereof and to supply (discharge) the maintained hydraulic pressure to the C1 control system 18 as is necessary.

The accumulator 44 includes a stepped piston 44b that is fitted to be slidable in one direction inside a stepped cylinder 44a. According to a small-diameter portion of this stepped piston 44b, a pressure accumulating chamber 44c used for accumulating oil is formed at the end portion of the small-diameter portion inside the stepped cylinder 44a, and the volume of the pressure accumulating chamber 44c is configured to be changeable in accordance with the movement of the stepped piston 44b.

The pressure accumulating chamber 44c of the accumulator 44 is connected to a pressure accumulation hydraulic passage 64 used for sucking and accumulating oil stored in the drain 34 and a discharge hydraulic passage 65 used for discharging the accumulated oil to the hydraulic path 36. On the pressure accumulation hydraulic passage 64, a check valve 66 used for preventing oil from flowing out to the drain 34 side at the time of discharge is disposed. In addition, on the discharge hydraulic passage 65, a check valve 67 (a pressure accumulation check valve) that prevents oil from flowing into the accumulator 44 from the hydraulic path 36 at the time of pressure accumulation is disposed.

On the accumulator 44 side of the check valve 66 on the pressure accumulation hydraulic passage 64 or the accumulator 44 side of the check valve 67 on the discharge hydraulic passage 65, a pressure sensor 46 that detects a pressure (accumulator pressure) Pacc of oil accumulated in the accumulator 44 is disposed, and the pressure sensor is configured to transmit information of the detected accumulator pressure Pacc to the ECU 7.

In a large-diameter side end portion of the accumulator 44 inside the stepped cylinder 44a, a first back pressure chamber 44d is formed by a large-diameter portion of the stepped piston 44b. In this first back pressure chamber 44d, a spring 44f that biases the stepped piston 44b to the pressure accumulating chamber 44c side is arranged, and the spring is configured to change the biasing force in accordance with the transformation of the spring 44f accompanied with the sliding of the stepped piston 44b, in other words, to change the level of the back pressure. When the accumulator 44 performs the pressure accumulation, the stepped piston 44b is pushed in so as to enlarge the volume of the pressure accumulating chamber 44c, oil is stored on the inside thereof, and the back pressure and the pressure (the accumulator pressure Pacc) of the oil accumulated inside the pressure accumulating chamber 44c are in a balanced state. On the other hand, when the accumulator 44 discharges oil, the accumulated oil is discharged from the inside by pushing out the piston using the biasing force of the spring 44f, and the oil is supplied to the C1 control system 18.

Here, the back pressure that can be generated by the spring 44f has a maximum value in a state in which a large-diameter side end face of the stepped piston 44b collides with a large-diameter side end portion of the stepped cylinder 44a. The maximum value of the back pressure, for example, can be set in advance by adjusting the length, the spring constant, and the like of the spring 44f such that the clutch pressure Pc1 is at least a pressure of a level for being maintained to be a pack filling pressure when the oil is discharged from the accumulator 44. Here, the "pack filling pressure" is a hydraulic pressure for filling a clutch pack (the hydraulic chamber of the forward/backward switching clutch C1) with hydraulic oil such that a clutch plate of the forward/backward switching clutch C1 is in the state of being brought into contact with (being packed into) a friction material.

Between a step difference portion of the stepped cylinder 44a of the accumulator 44 and a step difference portion of the stepped piston 44b, the second back pressure chamber 44e (the back pressure chamber) is formed. The accumulator 44 is configured to adjust the back pressure of the stepped piston 44b by adjusting the amount of supply of oil to the second back pressure chamber 44e. When the amount of supply of the oil to the second back pressure chamber 44e increases, the stepped piston 44b moves to the side of the large-diameter side end portion of the stepped cylinder 44a, the volume of the pressure accumulating chamber 44c is enlarged, and accordingly, the oil is accumulated in the pressure accumulating chamber 44c. On the other hand, in a case where the amount of supply of oil to the second back pressure chamber 44e decreases, the stepped piston 44b moves to the end portion side of the small-diameter side of the stepped cylinder 44a depending on the biasing force of the spring 44f, the volume of the pressure accumulating chamber 44c is reduced, and accordingly, the oil is discharged from the pressure accumulating chamber 44c. In other words, the hydraulic pressure of oil supplied to the second back pressure chamber 44e serves as an operating pressure switching between pressure accumulation/discharge of the accumulator 44. The second back pressure chamber 44e is connected to a back pressure control hydraulic passage 68 (hydraulic passage) and introduces/discharges oil through the back pressure control hydraulic passage 68.

The second exit hydraulic passage 63 is connected to the back pressure control hydraulic passage 68, and oil of the hydraulic pressure Peop2 that is output from the electric pump 33 is configured to be supplied to the second back pressure chamber 44e through the second exit hydraulic passage 63 and the back pressure control hydraulic passage 68. On the back pressure control hydraulic passage 68, a pressure accumulation control valve 45 used for controlling the supply of oil to the second back pressure chamber 44e of the accumulator 44 or the discharge of oil from the second back pressure chamber 44e is disposed.

The pressure accumulation control valve 45, for example, is a solenoid valve including three ports and is a so-called three-way on/off valve that can change a communicating port in accordance with conduction/non-conduction. Each port of the pressure accumulation control valve 45 is connected to the second exit hydraulic passage 63, the back pressure control hydraulic passage 68, and a discharge port Ex. At the time of conduction, the port is in a state (in description to be presented below, this state will be referred to as a state in which the pressure accumulation control valve 45 is open (an open valve)) in which the second exit hydraulic passage 63 and the back pressure control hydraulic passage 68 communicate with each other. On the other hand, at the time of non-conduction, the port is in a state (in description to be presented below, this state will be referred to as a state in which the pressure accumulation control valve 45 is closed (a closed valve)) in which the back pressure control hydraulic passage 68 and the discharge port Ex communicate with each other.

The pressure accumulating operation and the discharge operation of the accumulator 44 are controlled by the pressure accumulation control valve 45. The pressure accumulation structure of the accumulator 44 will be described with reference to FIG. 4. As illustrated in FIG. 4, when the pressure accumulation control valve 45 is open, the second exit hydraulic passage 63 communicates with the back pressure control hydraulic passage 68, and accordingly, the hydraulic pressure Peop2 output from the electric pump 33 is supplied (represented by "(1) Hydraulic Pressure Supply" in FIG. 4) to the second back pressure chamber 44e of the accumulator 44. By supplying the hydraulic pressure Peop2 to the second back pressure chamber 44e, the stepped piston 44b moves in a direction increasing the volume of the pressure accumulating chamber 44c and collides with the large-diameter side end portion of the stepped cylinder 44a (represented by "(2) Piston Stroke" in FIG. 4). Accordingly, the pressure accumulating chamber 44c is enlarged to a maximum volume, the oil stored in the drain 34 is sucked up from the pressure accumulation hydraulic passage 64, and the oil is sucked into the inside of the pressure accumulating chamber 44c of the accumulator 44 and is accumulated (represented by "(3) Oil Suction (Pressure Accumulation)" in FIG. 4). At this time, the suction of the oil from the hydraulic path 36 is prevented by the check valve 67 of the discharge hydraulic passage 65.

In other words, at the time of pressure accumulation, since the stepped piston 44b of the accumulator 44 moves to a position colliding with the stepped cylinder 44a, the back pressure has a maximum value, and accordingly, the pressure (the accumulator pressure Pacc) of oil inside the pressure accumulating chamber 44c balancing with the back pressure has a maximum value. Since the maximum value of the back pressure, as described above, is a pressure of a level for maintaining the clutch pressure Pc1 to be at least the pack filling pressure when oil is discharge from the accumulator 44, at this time, the accumulator pressure Pacc that is the pressure of the oil accumulated in the accumulator 44 is a pressure equal thereto.

The discharge structure of the accumulator 44 will be described with reference to FIG. 5. As illustrated in FIG. 5, when the pressure accumulation control valve 45 is closed, the back pressure control hydraulic passage 68 and the discharge port communicate with each other, and accordingly, a hydraulic pressure is discharged from the second back pressure chamber 44e of the accumulator 44 (represented by "(1) Discharge of Hydraulic Pressure" in FIG. 5). By discharging the hydraulic pressure Peop2 from the second back pressure chamber 44e, the stepped piston 44b moves in a direction decreasing the volume of the pressure accumulating chamber 44c depending on the biasing force of the spring 44f (represented by "(2) Piston Stroke" in FIG. 5). Accordingly, the oil accumulated on the inside of the pressure accumulating chamber 44c of the accumulator 44 is discharged to the discharge hydraulic passage 65 (represented by "(3) Oil Discharge" in FIG. 5). At this time, the flow-out of the oil to the drain 34 side is prevented by the check valve 66 of the pressure accumulation hydraulic passage 64.

Then, in accordance with the discharge of the oil from the accumulator 44, the clutch pressure Pc1 of the oil supplied to the C1 control system 18 rises at least up to the pack filling pressure.

The opening/closing operation of the pressure accumulation control valve 45 is controlled by the ECU 7. The pressure accumulation control valve 45 performs switching between opening and closing by adjusting a supply current by using the ECU 7. Here, the pressure accumulation control valve 45 may perform switching between a "state in which the second exit hydraulic passage 63 and the back pressure control hydraulic passage 68 communicate with each other" and a "state in which the back pressure control hydraulic passage 68 and the discharge port communicate with each other". In addition, the pressure accumulation control valve 45 may use another valve structure such as a spool valve, and a plurality of valve structures may be combined like combining an on/off valve, for example, having two ports and a switching valve performing switching between connection paths.

Referring back to FIG. 2, a position at which the accumulator 44 (discharge hydraulic passage 65) is connected to the hydraulic path 36 is located on the upstream side of the SLC linear solenoid 60, preferably, is located on the downstream side of the LPM No. 2 valve 54, and more preferably, is located on the downstream side of the branch of the fifth hydraulic passage 36e of the hydraulic path 36 into the sixth hydraulic passage 36f. In addition, on the upstream side (in the example illustrated in FIG. 2, a position located on the downstream side of the sixth hydraulic passage 36f) of the connection position of the accumulator 44 on the hydraulic path 36, a check valve 59 is disposed and is configured to efficiently raise the hydraulic pressure Plpm2 using the accumulator 44 by preventing a backward flow of the oil discharged from the accumulator 44 to the upstream side.

In this embodiment, out of the constituent elements of the vehicle 2 described above, at least the engine 3, the power transmission device 5 (particularly, the continuously variable transmission mechanism 11 and the C1 control system 18 (forward/backward switching clutch C1)) and the hydraulic control device 1 (particularly, the mechanical pump 31, the electric pump 33, and the accumulator 44) function as a vehicle control device according to this embodiment.

Next, the operation of the hydraulic control device 1 according to this embodiment will be described with reference to a flowchart illustrated in FIG. 6. A series of processes illustrated in the flowchart represented in FIG. 6 are performed, for example, for every predetermined period by the ECU 7 using the electric pump 33 of the hydraulic control device 1, the pressure accumulation control valve 45, and various kinds of sensor information of the vehicle 2, and the like.

As illustrated in FIG. 6, first, it is checked whether or not the speed reduction S&S control (idling stop traveling) is in the middle of execution (S101). As an execution period of the speed reduction S&S control, for example, a period from an engine stop instruction at the time of starting control to an engine start-up completion determination at the time of ending the control may be set. In a case where the speed reduction S&S control is not executed (No in S101), the process proceeds to Step S102. On the other hand, in a case where the speed reduction S&S control is in the middle of execution (Yes in S101), the process proceeds to Step S108.

In a case where it is determined that the speed reduction S&S control is not executed in Step S101, it is checked whether or not the current vehicle speed is a vehicle speed (S&S permission vehicle speed) or less for which the execution of the speed reduction S&S control is permitted (S102). In a case where the vehicle speed is higher than the S&S permission vehicle speed (No in S102), the process proceeds to Step S103. On the other hand, in a case where the vehicle speed is the S&S permission vehicle speed or less (Yes in S102), the process proceeds to Step S106.

In a case where the vehicle speed is determined, to be higher than the S&S permission vehicle speed in Step S102, it is checked whether or not fuel-cut control is in the middle of execution or whether or not the vehicle speed is a predetermined value or less (S103). As this predetermined value, a value that is the S&S permission vehicle speed or more used in Step S102 is set. In a case where the fuel-cut process is in the middle of execution or the vehicle speed is the predetermined value or less (Yes in S103), the process proceeds to Step S105. In the other cases (No in S103), the process proceeds to Step S104.

In a case where the condition of Step S104 is not satisfied, the driving of the electric pump 33 is stopped, the pressure accumulation control valve 45 is closed, and the execution of the speed reduction S&S control is prohibited (S104).

On the other hand, in a case where the condition of Step S104 is satisfied, the electric pump 33 is driven, the pressure accumulation control valve 45 is open (S105), and a pressure accumulating process of the accumulator 44, which has been described with reference to FIG. 4, is started. In other words, according to this embodiment, when the vehicle speed is in a range where the S&S permission speed is the predetermined value or less, the pressure accumulating process of the accumulator 44 can be started.

In a case where the vehicle speed is determined to be the S&S permission vehicle speed or less in Step S102, it is checked whether or not a condition (S&S start permission condition) other than the vehicle speed for which the execution of the speed reduction S&S control is permitted is satisfied (S106). Here, the S&S start permission condition, for example, is set for various kinds of information such as a brake/accelerator operation, a vehicle speed-reduction state, a battery state, the temperature of oil, and the temperature of engine cooling water. In a case where the S&S start permission condition is satisfied (Yes in S106), the process proceeds to Step S107. On the other hand, in a case where the S&S start permission condition is not satisfied (No in S106), the process ends.

In a case where it is determined that the S&S permission condition is satisfied in Step S106, the speed reduction S&S control is executed (S107), and opening control of the C1 control system 18 and the stop control of the engine are executed. In addition, at this time, the driving of the electric pump 33 that is executed in Step S105 and the open state of the pressure accumulating valve are maintained, and the oil is continuously accumulated in the accumulator 44.

In a case where it is determined that the speed reduction S&S control is executed in Step S101, it is checked whether or not there is an S&S return request (S108). Here, the S&S return request is an instruction for returning to normal engine traveling control from the speed reduction S&S control and, for example, may be detected by being triggered upon a state such as the turning-off of the brake, a decrease in the negative pressure of the brake, or a decrease in the battery voltage. In a case where there is the S&S return request (Yes in S108), the process proceeds to Step S109. On the other hand, in a case where there is no S&S return request (No in S108), the process ends.

In a case where it is determined that there is an S&S return request in Step S108, restart control of the engine 3 is started, the pressure accumulation control valve 45 is closed (S109), and the discharge process of the accumulator 44 that has been described with reference to FIG. 5 is executed. By using oil discharged from the accumulator 44, C1 pack filling control for increasing the clutch pressure Pc1 supplied to the C1 control system 18 up to the pack filling pressure can be performed.

Then, it is checked whether or not the start-up of the engine has been completed (S110). In a case where the start-up of the engine has not been completed (No in Step S110), the process ends. On the other hand, in a case where the start-up of the engine has been completed (Yes in S110), the driving of the electric pump 33 is stopped (S111).

Next, effect of the hydraulic control device 1 according to this embodiment will be described.

The hydraulic control device 1 according to this embodiment is mounted in a vehicle 2 that includes the engine 3 and the power transmission device 5 including the continuously variable transmission mechanism 11 and the C1 control system 18 (forward/backward switching clutch C1), and the hydraulic pressure supplied for operating the power transmission device 5 is controlled. This vehicle 2 can execute the idling stop function for executing the stopping of the engine 3 and the release of the C1 control system 18 (forward/backward switching clutch C1) not only when the vehicle stops but also during the traveling of the vehicle such as at the time of speed reduction.

Conventionally, in a case where the idling stop function is executed when the vehicle stops, it has been only necessary to secure a belt clamping pressure of a level for which the belt-type continuously variable transmission mechanism 11 of the power transmission device 5 is not influenced by cranking performed at the time of restarting the engine. More specifically, a hydraulic pressure of about 0.3 MPa is required as the secondary pressure Pd supplied to the secondary sheave 21a that controls the belt clamping pressure.

In contrast to this, in a case where the idling stop function is executed also in the middle of traveling of the vehicle, as in this embodiment, a situation may be considered in which a higher belt clamping pressure is necessary. For example, when a change in rotation due to an external disturbance such as sudden braking, traveling of a rough road, or a change in the road surface is input from the driving wheel 4 side to the power transmission device 5 during the idling stop traveling, a change in the torque is generated in accordance with the input of the external disturbance, and there is concern that a slip of the belt 22 occurs in the continuously variable transmission mechanism 11, whereby there are cases where the power transmission is badly affected. The belt clamping pressure to be secured for not being influenced by the input of such an external disturbance is higher than that of a case where the vehicle stops. More specifically, as the secondary pressure Pd, a hydraulic pressure of about 1.5 Mpa and a flow rate of the oil of about six (liter/min) are required, and a hydraulic response of several tens of milliseconds is required.

In a case where the electric pump 33 is used as the substitution of the mechanical pump 31 for securing such a belt clamping pressure, in other words, in a case where a configuration is employed in which oil is supplied to the hydraulic path 36 by the electric pump 33, it is necessary to configure the size of the electric pump 33 to be very large. For example, in order to generate a hydraulic pressure that is five times higher than that at the time of stopping of the vehicle as in the above-described example, the volume of the electric pump needs to be increased by about 25 times. Thus, for implementing the idling stop function at the time of stopping of the vehicle, while an electric pump having power consumption of a class of only several tens of watts is required, for implementing the idling stop function at the time of traveling of the vehicle, an electric pump having power consumption of a class of kilowatts is necessary. In addition, in a case where a required belt clamping pressure is high, the leaking hydraulic flow inside the hydraulic path 36 from the electric pump 33 to the continuously variable transmission mechanism 11 increases, and accordingly, it is necessary to further increase the size of the electric pump in consideration of the influence of the leaking hydraulic flow. There is concern that such an increase in the size of the electric pump may cause problems such as an increase in the cost and the degradation of mountability.

In addition, at the time of returning from the idling stop state, it is desirable to secure control responsiveness of the C1 control system 18 by setting the C1 control system 18 (the forward/backward switching clutch C1) to be in a quickly re-startable state (an operable state or a state in which the clutch pack is filled up) by the time of completion of the restart of the engine.

Thus, the hydraulic control device 1 according to this embodiment includes: the electric pump 33 that supplies oil to the belt-type continuously variable transmission mechanism 11 of the power transmission device 5 through the hydraulic path 36 in accordance with the driving of the motor 32; and the accumulator 44 that accumulates oil on the inside thereof using the oil supplied by the electric pump 33 and supplies the oil to the C1 control system 18 by discharging the accumulated oil through the hydraulic path 36.

By employing the above-described configuration, during the execution of the idling stop function, the oil is supplied to the continuously variable transmission mechanism 11 by the electric pump 33, and accordingly, the secondary pressure Pd is raised so as to secure a belt clamping pressure capable of preventing the occurrence of a slip of the belt 22, and the raised secondary pressure can be supplied to the continuously variable transmission mechanism 11.

In addition, since the electric pump 33 directly supplies the oil to the continuously variable transmission mechanism 11, a leaking hydraulic flow from the electric pump 33 to the continuously variable transmission mechanism 11 can be reduced, whereby the size of the electric pump 33 can be reduced.

Meanwhile, when the engine 3 is returned from the idling stop function and is restarted, the oil accumulated by the accumulator 44 is supplied to the C1 control system 18. Thus, at the time of returning from the idling stop state, the C1 control system 18 (forward/backward switching clutch C1) is set to be in a quickly re-startable state (the operable state or the state in which the clutch pack is filled up) by the time of the completion of the restart-up of the engine, whereby the control responsiveness of the C1 control system 18 can be secured.

In addition, the period at which the oil is supplied from the accumulator 44 can be set to a short time period until the engine is restarted from the end of the idling stop traveling, and the accumulated pressure of the accumulator 44 is used for the control of the C1 control system 18 having a lower required hydraulic pressure than that of the belt clamping pressure, whereby the size of the accumulator 44 can be reduced.

As above, according to the hydraulic control device 1 of this embodiment, increases in the sizes of the electric pump 33 and the accumulator 44 used for controlling the hydraulic pressure at the time of executing the idling stop function can be suppressed.

In addition, since the accumulator 44 is configured to accumulate oil on the inside thereof by using the oil supplied by the electric pump 33, the pressure can be accumulated without consuming the oil discharged from the mechanical pump 31. Accordingly, even in a state in which the amount of oil discharged by the mechanical pump 31 is small, for example, as in a case where the engine is rotated at low speed, a case where there is an instruction for increasing the line pressure PL, a case where the temperature of the oil is high, or the like, the influence of the pressure accumulating operation on the hydraulic pressure regulating characteristic or the responsiveness of the hydraulic control device 1 can be reduced, and accordingly, the pressure can be accumulated in the accumulator 44. As a result, the timing at which the pressure accumulation of the accumulator 44 can be performed can be expanded.

Here, in a case where a configuration is employed in which the pressure accumulation is performed by introducing the oil discharged from the mechanical pump 31 into the accumulator 44, during the execution of the idling stop function, the mechanical pump 31 stops, and the pressure accumulating process cannot be performed. Accordingly, there is concern that the accumulator pressure Pacc that is the hydraulic pressure of the oil accumulated inside the accumulator 44 may be lowered by the influence of oil leakage in the accumulator 44 or the like. Since it is necessary to maintain the accumulator pressure Pacc to a level for which the clutch pressure Pc1 can be raised up to the pack filling pressure at the time of returning from the idling stop function, there are cases where the idling stop function cannot be continued for a long time. In contrast to this, according to this embodiment, since the accumulator 44 is configured to accumulate the oil on the inside thereof by using the oil supplied by the electric pump 33, the pressure can be accumulated also during the execution of the idling stop function when the engine 3 stops. Accordingly, even in a case where the accumulator pressure Pacc is lowered due to an oil leakage or the like, the pressure can be appropriately accumulated in the accumulator 44. Thus, the continuation time of the idling stop function can be suppressed from being shortened, and accordingly, the idling stop function can be executed for a long time.

In addition, in the hydraulic control device 1 according to this embodiment, the accumulator 44 performs the pressure accumulation and the discharge of oil by using the oil supplied by the electric pump 33 as an operating pressure.

According to such a configuration, since the oil discharged from the electric pump 33 is simply used as an operating pressure instead of being directly introduced into the inside of the accumulator 44 and accumulated, pressure accumulation, pressure maintenance, discharge, and the like of the accumulator can be controlled without increasing the amount of oil discharged from the electric pump 33, whereby the accumulator can be efficiently controlled.

In addition, the hydraulic control device 1 according to this embodiment includes the back pressure control hydraulic passage 68 that communicates with the second back pressure chamber 44e such that the oil supplied by the electric pump 33 can be introduced into the second back pressure chamber 44e adjusting the back pressure of the accumulator 44 and the pressure accumulation control valve 45 that is disposed on the back pressure control hydraulic passage 68 and controls the introduction of oil into the second back pressure chamber 44e or the discharge of oil from the second back pressure chamber 44e. The accumulator 44 accumulates the oil on the inside thereof in the state in which the oil supplied from the electric pump 33 is introduced from the back pressure control hydraulic passage 68 into the second back pressure chamber 44e by the pressure accumulation control valve 45 and supplies the oil accumulated inside to the C1 control system 18 by discharging the accumulated oil to the hydraulic path 36 in the state in which the oil is discharged from the second back pressure chamber 44e to the back pressure control hydraulic passage 68 by the pressure accumulation control valve 45.

Accordingly, since the amount of oil used for the control of the accumulator can be suppressed to an amount of oil that can be introduced into the second back pressure chamber 44e of the accumulator 44, the accumulator can be controlled more efficiently. In addition, by controlling the opening/closing operation of the pressure accumulation control valve 45, switching between the supply of oil and the discharge of oil of the second back pressure chamber 44e is performed, whereby the pressure accumulation, the pressure maintenance, and the discharge performed by the accumulator 44 can be controlled. Accordingly, the accumulator can be controlled with high accuracy in a simple manner.

In addition, the hydraulic control device 1 according to this embodiment includes the check valve 67 that is disposed between the accumulator 44 and the hydraulic path 36 and prevents the flow of oil from the hydraulic path 36 to the accumulator 44.

According to such a configuration, when the oil of the drain 34 is introduced from the pressure accumulation hydraulic passage 64 into the accumulator 44 at the time of pressure accumulation, the introduction of oil from the hydraulic path 36 can be prevented. Accordingly, the consumption of the oil of the hydraulic path 36, in other words, the oil discharged from the mechanical pump 31 accompanied with the pressure accumulation control of the accumulator 44 can be prevented. As a result, even during the pressure accumulating operation of the accumulator 44, a decrease in the hydraulic pressure of the hydraulic path 36 is suppressed, whereby the accuracy of the hydraulic pressure control of the C1 control system 18 can be maintained.

Second Embodiment

Figure 7:
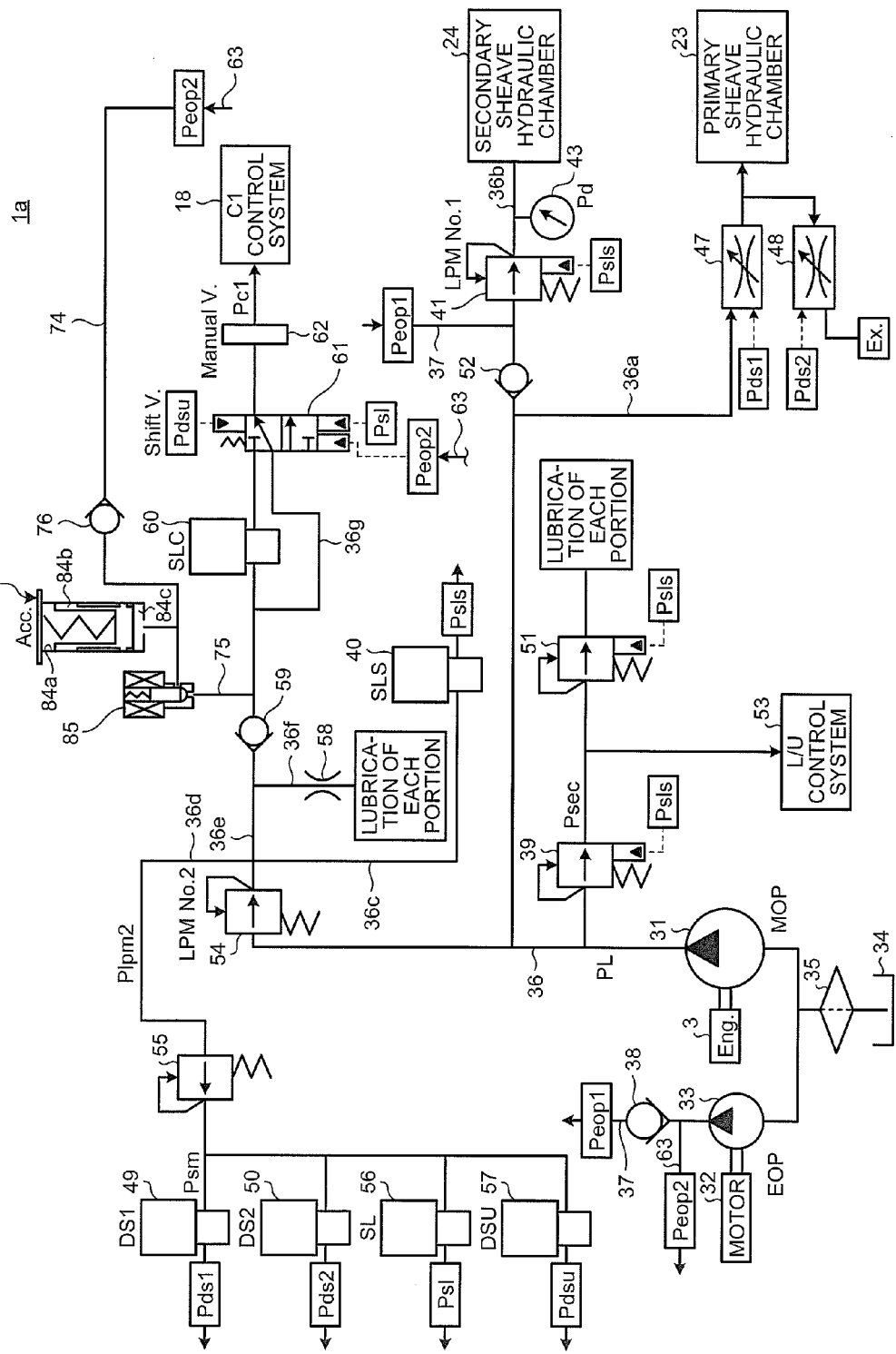
FIG. 7 is a diagram illustrating a schematic configuration of a hydraulic control device according to a second embodiment of the present invention.

Next, a second embodiment of the present invention will be described with reference to FIG. 7. FIG. 7 is a diagram illustrating a schematic configuration of a hydraulic control device 1a according to the second embodiment of the present invention.

As illustrated in FIG. 7, the hydraulic control device 1a according to this embodiment is different from the hydraulic control device 1 according to the first embodiment in that the hydraulic control device 1a accumulates oil supplied by the electric pump 33 in the accumulator 84.

The accumulator 84 according to this embodiment may have the same configuration as the accumulator 44 according to the first embodiment or any other known configuration. For example, FIG. 7 illustrates an exemplary piston-type accumulator 84 having a configuration in which a piston 84b is arranged to be slidable inside a cylinder 84a, and oil is accumulated inside a pressure accumulating chamber 84c that is formed by the piston 84b and the cylinder 84a.

The pressure accumulating chamber 84c of the accumulator 84 is connected to a pressure accumulation hydraulic passage 74 and a discharge hydraulic passage 75. The pressure accumulation hydraulic passage 74 is connected to a second exit hydraulic passage 63 of an electric pump 33 and is a hydraulic passage communicating with an accumulator 84 such that oil supplied by the electric pump 33 can be introduced into the accumulator 84. On the pressure accumulation hydraulic passage 74, a check valve 76 used for preventing the flow-out of the oil to the electric pump 33 side at the time of discharge is disposed.

The discharge hydraulic passage 75 is a hydraulic passage that is used for discharging oil accumulated in the accumulator 84 to the hydraulic path 36. The discharge hydraulic passage 75, similar to the discharge hydraulic passage 65 according to the first embodiment, is connected to a hydraulic path 36 on the upstream side of an SLC linear solenoid 60, preferably, on the downstream side of an LPM No. 2 valve 54, and more preferably, on the downstream side of the branch of a fifth hydraulic passage 36e of the hydraulic path 36 into a sixth hydraulic passage 36f.

On the discharge hydraulic passage 75, a pressure accumulation control valve 85 (switching valve) that performs switching between communicating and blocking between the accumulator 84 and the hydraulic path 36 is disposed. The opening/closing operation of the pressure accumulation control valve 85 is controlled by the ECU 7. The pressure accumulation control valve 85, for example, is an electromagnetic poppet valve as illustrated in FIG. 7, and the switching between opening and closing is performed by adjusting a supply current using the ECU 7. In addition, other valve structure such as a spool valve may be used as the pressure accumulation control valve 85.

The pressure accumulation of oil in the accumulator 84 and the discharge of oil from the accumulator 84 are controlled by the operations of the pressure accumulation control valve 85 and the electric pump 33.

When the pressure accumulation control valve 85 is closed (closed valve), the accumulator 84 and the hydraulic path 36 are blocked from each other. At this time, when the electric pump 33 is driven, the oil discharged from the electric pump 33 is introduced into the pressure accumulating chamber 84c of the accumulator 84 through a second exit hydraulic passage 63 and a pressure accumulation hydraulic passage 74 and is accumulated therein.

On the other hand, when the pressure accumulation control valve 85 is open (opening valve), the accumulator 84 and the hydraulic path 36 communicate with each other, and the oil accumulated in the accumulator 84 is discharged to the hydraulic path 36. In addition, at this time, the flow-out of the oil to the electric pump 33 side is prevented by the check valve 76 disposed on the pressure accumulation hydraulic passage 74.

The hydraulic control device 1a according to this embodiment, similar to the first embodiment, has a configuration in which oil is supplied to the continuously variable transmission mechanism 11 by the electric pump 33, and oil is supplied to the C1 control system 18 by the accumulator 84, and accordingly, increases in the sizes of the electric pump 33 and the accumulator 44 used for the hydraulic pressure control at the time of executing the idling stop function can be suppressed.

In addition, according to the hydraulic control device 1a of this embodiment has a configuration in which the accumulator 84 accumulates oil on the inside thereof by using the oil supplied by the electric pump 33 (described in more detail, pressure accumulation of the oil supplied by the electric pump 33 is performed), and accordingly, pressure accumulation can be performed without consuming the oil discharged from the mechanical pump 31. Accordingly, even in a state in which the amount of oil discharged by the mechanical pump 31 is small, for example, as in a case where the engine is rotated at low speed, a case where there is an instruction for increasing the line pressure PL, or the like, the influence of the pressure accumulating operation on the hydraulic pressure regulating characteristic or the responsiveness of the hydraulic control device 1 can be reduced, and accordingly, the pressure can be accumulated in the accumulator 84. As a result, the timing at which the pressure accumulation of the accumulator 44 can be performed can be expanded.

Here, in a case where a configuration is employed in which the pressure accumulation is performed by introducing the oil discharged from the mechanical pump 31 into the accumulator 44, during the execution of the idling stop function, the mechanical pump 31 stops, and the pressure accumulating process cannot be performed. Accordingly, there is concern that the accumulator pressure Pacc that is the hydraulic pressure of the oil accumulated inside the accumulator 84 may be lowered by the influence of oil leakage in the accumulator 84 or the like. Since it is necessary to maintain the accumulated hydraulic pressure of the inside the accumulator 84 to a level for which the clutch pressure Pc1 can be raised up to the pack filling pressure at the time of returning from the idling stop function, there are cases where the idling stop function cannot be continued for a long time. In contrast to this, according to this embodiment, since the accumulator 84 is configured to accumulate the oil on the inside thereof by using the oil supplied by the electric pump 33, the pressure can be accumulated also during the execution of the idling stop function when the engine 3 stops. Accordingly, even in a case where the accumulator pressure Pacc is lowered due to an oil leakage or the like, the pressure can be appropriately accumulated, whereby the idling stop function can be executed for a long time.

In addition, the hydraulic control device 1a according to this embodiment includes: the pressure accumulation hydraulic passage 74 that communicates with the accumulator 84 such that the oil supplied by the electric pump 33 can be introduced into the accumulator 84; the discharge hydraulic passage 75 that connects the accumulator 84 and the hydraulic path 36 together; and the pressure accumulation control valve 85 that is disposed on the discharge hydraulic passage 75 and performs switching between communicating and blocking between the accumulator 84 and the hydraulic path 36. The accumulator 84 accumulates the oil supplied from the pressure accumulation hydraulic passage 74 by the electric pump 33 on the inside thereof in a case where the electric pump 33 is driven and is blocked from the hydraulic path 36 by the pressure accumulation control valve 85 and discharges the oil accumulated on the inside thereof to the hydraulic path 36 through the discharge hydraulic passage 75 and supplies the oil to the C1 control system 18 in a case where the accumulator 84 communicates with the hydraulic path 36 through the pressure accumulation control valve 85.

According to such a configuration, by controlling the opening/closing operation of the pressure accumulation control valve 85, the pressure accumulation, the pressure maintenance, and the discharge performed by accumulator 84 can be controlled, whereby the accumulator can be controlled with high accuracy in a simple manner.

As above, while the preferred embodiments of the present invention have been described, the present invention is not limited thereto. The present invention may be configured by combining a plurality of the embodiments described above. In addition, each constituent element of the embodiment may be changed to an element, which can be easily substituted with the element by those skilled in the art, or an element that is substantially the same as the constituent element.

In the above-described embodiments, as a clutch that is hydraulically controlled together with the continuously variable transmission mechanism 11 by the hydraulic control device 1 or 1a, while the C1 control system 18 (the forward/backward switching clutch C1 and the forward/backward switching brake B1) of the forward/backward traveling switching mechanism 10 has been illustrated as an example, a clutch other than the forward/backward traveling switching mechanism 10 may be used as the clutch as long as the clutch can block rotation torque between the engine 3 and the driving wheel 4 side in the released state and can deliver torque between the engine 3 and the driving wheel 4 side in the engaged state.

In addition, the electric pump 33 only needs to be connected to the hydraulic path 36 so as to supply oil to the sheave that controls the belt clamping pressure of the continuously variable transmission mechanism 11. In the above-described embodiments, since the configuration in which the secondary sheave 21a controls the belt clamping pressure is illustrated as an example, the electric pump 33 is connected to the second hydraulic passage 36b that supplies oil to the secondary sheave 21a. However, in a case where the primary sheave 20a is configured to control the belt clamping pressure, the electric pump 33 may be connected to the first hydraulic passage 36a that supplies oil to the primary sheave 20a.

REFERENCE SIGNS LIST 1 and 1a HYDRAULIC CONTROL DEVICE VEHICLE
5 POWER TRANSMISSION DEVICE
11 CONTINUOUSLY VARIABLE TRANSMISSION MECHANISM (BELT-TYPE CONTINUOUSLY VARIABLE TRANSMISSION MECHANISM)
18 C1 CONTROL SYSTEM (CLUTCH)
32 MOTOR
33 ELECTRIC PUMP
36 HYDRAULIC PATH
44 and 84 ACCUMULATOR
44e SECOND BACK PRESSURE CHAMBER (BACK PRESSURE CHAMBER)
45 PRESSURE ACCUMULATION CONTROL VALVE
67 CHECK VALVE (PRESSURE ACCUMULATION CHECK VALVE)
68 BACK PRESSURE CONTROL HYDRAULIC PASSAGE (HYDRAULIC PASSAGE)
74 PRESSURE ACCUMULATION HYDRAULIC PASSAGE
75 DISCHARGE HYDRAULIC PASSAGE
85 PRESSURE ACCUMULATION CONTROL VALVE (SWITCHING VALVE)

The invention claimed is:

1. A hydraulic control device that controls a hydraulic pressure of oil supplied for operating a power transmission device including a continuously variable transmission mechanism and a clutch, the continuously variable transmission mechanism including a belt stretched over between pulleys, the hydraulic control device comprising:
an electric pump configured to supply oil to the continuously variable transmission mechanism from among the continuously variable transmission mechanism and the clutch of the power transmission device through a first hydraulic path based on motor driving; and
an accumulator configured to accumulate oil inside by using the oil supplied by the electric pump, and supply the oil to the clutch from among the continuously variable transmission mechanism and the clutch of the power transmission device by discharging the accumulated oil through a second hydraulic path that is different from the first hydraulic path, wherein the accumulator is connected only to the clutch from among the continuously variable transmission mechanism and the clutch of the power transmission device through the second hydraulic path such that the accumulated oil is supplied to the clutch.

2. The hydraulic control device according to claim 1, wherein
the accumulator performs pressure accumulation and discharge of oil by using the oil supplied by the electric pump as an operating pressure.

3. The hydraulic control device according to claim 2, further comprising:
a hydraulic passage configured to communicate with a back pressure chamber adjusting a back pressure of the accumulator such that the oil supplied by the electric pump can be introduced into the back pressure chamber; and
a pressure accumulation control valve disposed on the hydraulic passage and configured to control introduction of oil into the back pressure chamber or discharge of the oil from the back pressure chamber, wherein
the accumulator accumulates oil inside in a state in which the oil supplied by the electric pump is introduced into the back pressure chamber from the hydraulic passage by the pressure accumulation control valve, and supplies the oil accumulated inside to the clutch by discharging the oil to the second hydraulic path in a state in which the oil is discharged from the back pressure chamber to the hydraulic passage by the pressure accumulation control valve.

4. The hydraulic control device according to claim 2, further comprising:
a pressure accumulation check valve disposed between the accumulator and the second hydraulic path and configured to prevent a flow of oil from the hydraulic second path side to the accumulator.

5. The hydraulic control device according to claim 1, wherein
the accumulator performs pressure accumulation of the oil supplied by the electric pump.

6. The hydraulic control device according to claim 5, further comprising:
a pressure accumulation hydraulic passage configured to communicate with the accumulator such that the oil supplied by the electric pump can be introduced into the accumulator;
a discharge hydraulic passage configured to connect the accumulator and the second hydraulic path together; and
a switching valve disposed on the discharge hydraulic passage and configured to switch between communicating and blocking between the accumulator and the second hydraulic path, wherein
the accumulator accumulates the oil supplied from the pressure accumulation passage by the electric pump on the inside thereof in a case where the electric pump is driven and is blocked from the second hydraulic path by the switching valve, and supplies the oil accumulated inside to the clutch by discharging the accumulated oil on the inside to the second hydraulic path through the discharge hydraulic passage in a case where the accumulator communicates with the second hydraulic path through the switching valve.

7. A vehicle control device comprising:
a power transmission device configured to include a continuously variable transmission mechanism and a clutch, the continuously variable transmission mechanism including a belt stretched over between pulleys; and the hydraulic control device according to claim 1 configured to control a hydraulic pressure of oil supplied for operating the power transmission device.

8. The hydraulic control device according to claim 3, further comprising:

a pressure accumulation check valve disposed between the accumulator and the second hydraulic path and configured to prevent a flow of oil from the hydraulic second path side to the accumulator.

9. A vehicle control device comprising:

a power transmission device configured to include a continuously variable transmission mechanism and a clutch, the continuously variable transmission mechanism including a belt stretched over between pulleys; and the hydraulic control device according to claim 2 configured to control a hydraulic pressure of oil supplied for operating the power transmission device.

10. A vehicle control device comprising:

a power transmission device configured to include a continuously variable transmission mechanism and a clutch, the continuously variable transmission mechanism including a belt stretched over between pulleys; and the hydraulic control device according to claim 3 configured to control a hydraulic pressure of oil supplied for operating the power transmission device.

11. A vehicle control device comprising:

a power transmission device configured to include a continuously variable transmission mechanism and a clutch, the continuously variable transmission mechanism including a belt stretched over between pulleys; and the hydraulic control device according to claim 4 configured to control a hydraulic pressure of oil supplied for operating the power transmission device.

12. A vehicle control device comprising:

a power transmission device configured to include a continuously variable transmission mechanism and a clutch, the continuously variable transmission mechanism including a belt stretched over between pulleys; and the hydraulic control device according to claim 5 configured to control a hydraulic pressure of oil supplied for operating the power transmission device.

13. A vehicle control device comprising:

a power transmission device configured to include a continuously variable transmission mechanism and a clutch, the continuously variable transmission mechanism including a belt stretched over between pulleys; and the hydraulic control device according to claim 6 configured to control a hydraulic pressure of oil supplied for operating the power transmission device.

\* \* \* \* \*